(12) United States Patent
Lei et al.

(10) Patent No.: US 10,103,868 B2
(45) Date of Patent: Oct. 16, 2018

(54) NARROW BAND SYNCHRONIZATION SIGNAL TRANSMISSION AND DETECTION

(71) Applicant: QUALCOMM Incorporated, San Diego, CA (US)

(72) Inventors: Jing Lei, San Diego, CA (US); Peter Gaal, San Diego, CA (US); Hao Xu, San Diego, CA (US); Xiao feng Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/436,047

(22) Filed: Feb. 17, 2017

(65) Prior Publication Data

US 2017/0288848 A1 Oct. 5, 2017

Related U.S. Application Data

(60) Provisional application No. 62/318,725, filed on Apr. 5, 2016, provisional application No. 62/320,486, filed on Apr. 9, 2016.

(51) Int. Cl.
  *H04L 7/00* (2006.01)
  *H04L 1/00* (2006.01)
  (Continued)

(52) U.S. Cl.
  CPC ........ *H04L 7/0054* (2013.01); *H04J 11/0076* (2013.01); *H04L 1/0063* (2013.01);
  (Continued)

(58) Field of Classification Search
  CPC .............. H04L 5/0053; H04L 27/2657; H04B 1/70735; H04B 1/70752; H04B 1/7083; H04B 7/0626
  See application file for complete search history.

(56) References Cited

U.S. PATENT DOCUMENTS

| 9,609,585 B1* | 3/2017 | Markovic ............. H04W 48/16 |
| 2017/0033912 A1* | 2/2017 | Onggosanusi ....... H04B 7/0626 |
| 2017/0207934 A1* | 7/2017 | Iyer Seshadri ... H04L 25/03834 |

FOREIGN PATENT DOCUMENTS

WO 2012159498 A1 11/2012

OTHER PUBLICATIONS

Ericsson: "Narrowband LTE—Synchronization Channel Design and Performance", 3GPP Draft, R1-156009—Narrowband LTE—Synchronization Channel Design and Performance, 3rd Generation Partnership Project (3GPP), Mobile Competence Centre, 650, Route des Lucioles, F-06921 Sophia, vol. RAN WG1, No. Malmo, Sweden, Oct. 5, 2015-Oct. 10, 2015, Sep. 30, 2015, XP051041885, Retrieved from the Internet: URL:http://www.3gpp.org/ftp/tsg_ran/WG1_RL1/TSGR1_82b/Docs/ [retrieved on Sep. 30, 2015].

(Continued)

*Primary Examiner* — David S Huang
(74) *Attorney, Agent, or Firm* — Arent Fox, LLP

(57) ABSTRACT

In order to reduce ambiguity in NB-SSS and complexity of receiver processing, a transmitter apparatus generates an SSS, wherein the SSS signal comprises a sequence of OFDM symbols, wherein each symbol of the sequence of SSS symbols is mapped to a codeword symbol of an FEC code. Source symbols of the sequence of SSS symbols carry a PCID and frame timing information, and parity symbols of the sequence of SSS symbols introduce redundancy and coding gain. A receiver receives the NB-SSS over multiple OFDM symbols, each symbol of the SSS comprising a short ZC sequence with a combination of root index and cyclic shift. The apparatus derives path metrics using cross-correlation for each of the plurality of symbols, determines a candidate SSS source message based on the derived path metrics and coding constraints of FEC codewords, and identifies a PCID and timing information based on the candidate SSS source message.

32 Claims, 16 Drawing Sheets

(51) Int. Cl.
| | |
|---|---|
| H04W 4/00 | (2018.01) |
| H04W 4/70 | (2018.01) |
| H04J 11/00 | (2006.01) |
| H04L 27/26 | (2006.01) |
| H04L 5/00 | (2006.01) |
| H04J 13/00 | (2011.01) |
| H04L 5/14 | (2006.01) |

(52) U.S. Cl.
CPC .......... *H04L 5/0007* (2013.01); *H04L 5/0053* (2013.01); *H04L 27/2613* (2013.01); *H04L 27/2663* (2013.01); *H04W 4/70* (2018.02); *H04J 13/0062* (2013.01); *H04L 5/1469* (2013.01); *H04L 27/2601* (2013.01)

(56) References Cited

OTHER PUBLICATIONS

International Search Report and Written Opinion—PCT/US2017/018742—ISA/EPO—dated May 8, 2017.

Qualcomm Incorporated: "NB-PSS and NB-SSS Design", 3GPP Draft, R1-160105, NB-PSS and NB-SSS Design, 3rd Generation Partnership Project (3GPP), Mobile Competence Centre, 650, Route des Lucioles, F-06921, Sophia-Antipolis Cedex, France, vol. RAN WG1, No. Budapest, Hu, Jan. 18, 2016-Jan. 20, 2016, Jan. 12, 2016, XP051064718, Retrieved from the Internet: URL:http://www.3gpp.org/ftp/tsg_ran/WG1_RL1/TSGR1_AH/LTE_NB-IoT_1691/Docs/ [retrieved on Jan. 12, 2016].

Qualcomm Incorporated: "NB-SSS Design", 3GPP Draft, R1-163407, NB-SSS Design, 3rd Generation Partnership Project (3GPP), Mobile Competence Centre, 650, Route des Lucioles, F-06921 Sophia-Antipolis Cedex, France, vol. TSG RAN, No. Busan, Korea, Apr. 11, 2016-Apr. 15, 2016, Apr. 18, 2016, XP051090393, Retrieved from the Internet: URL:http://www.3gpp.org/ftp/tsg_ran/WG1_RL1/TSGR1_84b/Docs/ [retrieved on Apr. 18, 2016].

ZTE: "Considerations on Synchronization Signal Design of NB-IoT", 3GPP Draft; R1-156625 Synchronization Signal NB-IOT Final, 3rd Generation Partnership Project (3GPP), Mobile Competence Centre, 650, Route des L ucioles, F-06921 Sophia-Antipolis Cedex, France, vol. RAN WG1, No. Anaheim, USA, Nov. 15, 2015-Nov. 22, 2015, Nov. 15, 2015 (Nov. 15, 2015), XP051003029, Retrieved from the Internet: URL:http://www.3gpp.org/ftp/Meetings_3GPP_SYNC/RAN1/Docs/ [retrieved on Nov. 15, 2015].

\* cited by examiner

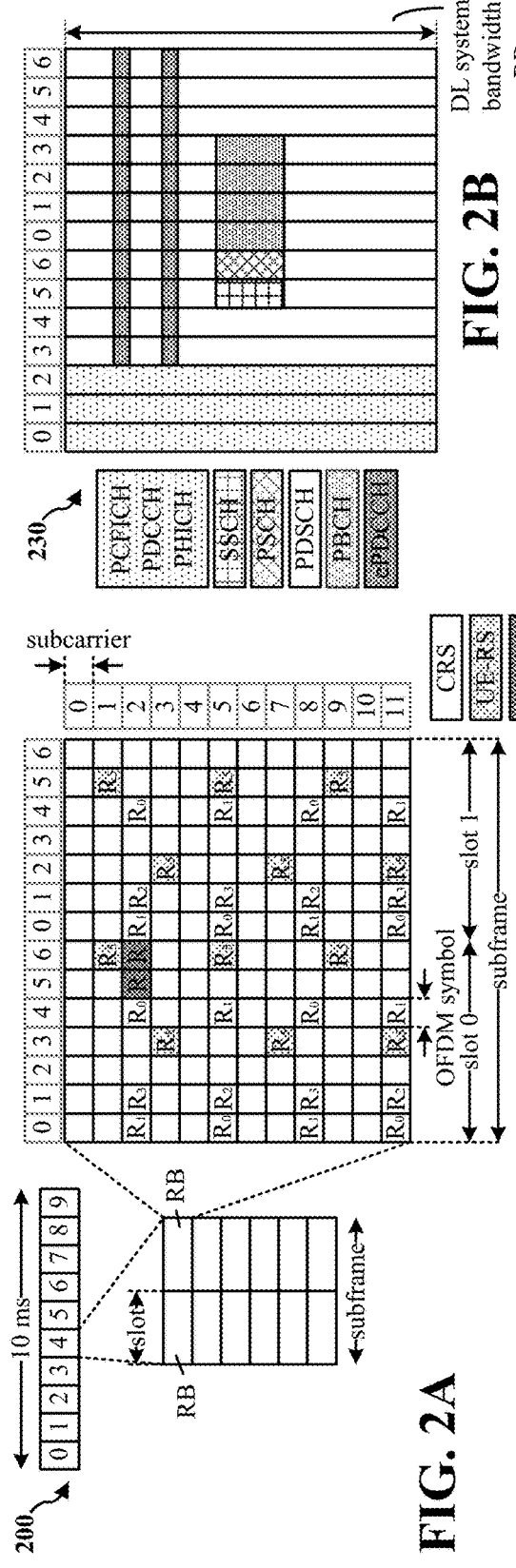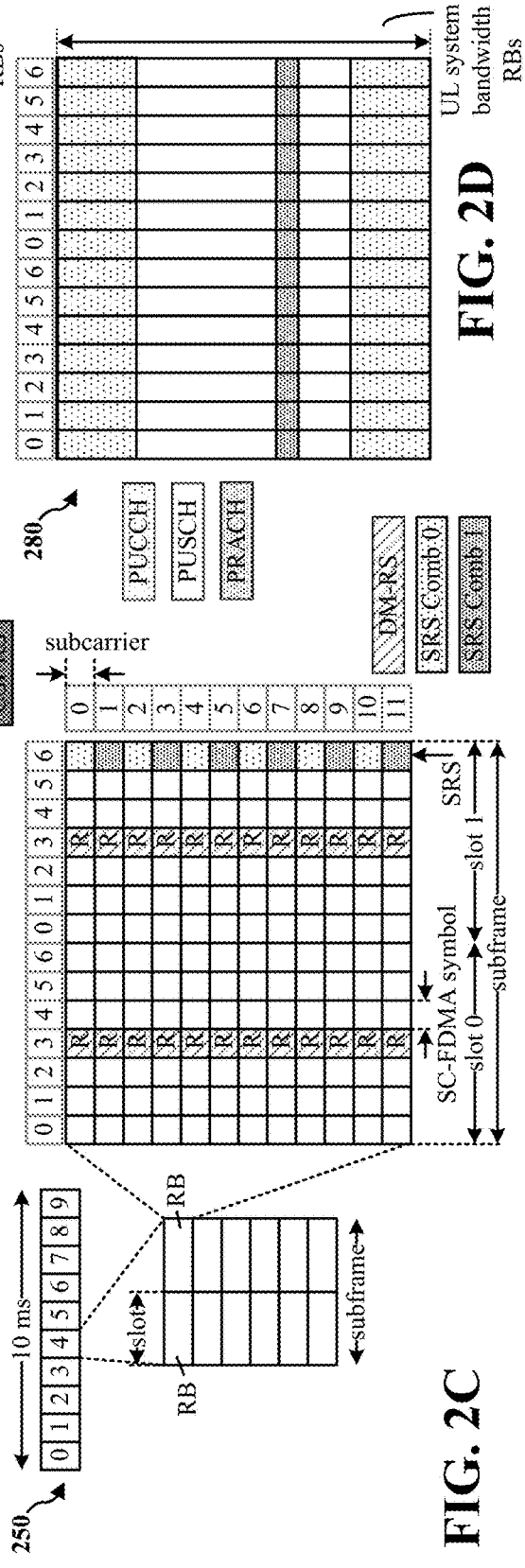

|  | $\Omega_0$ | $\Omega_1$ |  |
|---|---|---|---|
| $u = 1$ |  |  | $u = 2$ |
| $u = 3$ |  |  | $u = 6$ |
| $u = 4$ |  |  | $u = 8$ |
| $u = 5$ |  |  | $u = 7$ |
| $u = 9$ |  |  | $u = 10$ |
FIG. 5

SSS Null Tone Positioning: Sector ID = 0

| Tone #0 | Tone #1 | Tone #2 | Tone #3 | Tone #4 | Tone #5 | Tone #6 | Tone #7 | Tone #8 | Tone #9 | Tone #10 | Tone #11 |
|---|---|---|---|---|---|---|---|---|---|---|---|
| | Symbol #3 | Symbol #4 | Symbol #5 | Symbol #6 | Symbol #7 | Symbol #8 | Symbol #9 | Symbol #10 | Symbol #11 | Symbol #12 | Symbol #13 |

☐ Null ▨ NB-SSS Base Sequence ▩ CRS Puncture

NARROW BAND SYNCHRONIZATION SIGNAL TRANSMISSION AND DETECTION

CROSS-REFERENCE TO RELATED APPLICATIONS

This application claims the benefit of U.S. Provisional Application Ser. No. 62/318,725, entitled "Narrow Band Secondary Synchronization Signal" and filed on Apr. 5, 2016, and of U.S. Provisional Application Ser. No. 62/320,486, entitled "Narrow Band Secondary Synchronization Signal" and filed on Apr. 9, 2016, each of which is expressly incorporated by reference herein in its entirety.

BACKGROUND

Field

The present disclosure relates generally to communication systems, and more particularly, to aspects of a Narrow Band (NB) Secondary Synchronization Signal (SSS) (NB-SSS).

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology.

In another example, a fifth generation (5G) wireless communications technology (which can be referred to as new radio (NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. However, as the demand for mobile broadband access continues to increase, there exists a need for further improvements in LTE technology. These improvements may also be applicable to other multi-access technologies and the telecommunication standards that employ these technologies.

In Narrow Band (NB) wireless communication, resources for wireless communications may be limited. For example, in narrow band internet-of-things (NB-IOT), wireless communication is limited to a single Resource Block (RB). In eMTC, communication is limited to six RBs. Such limited resources lead to unique challenges in transmitting data.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In LTE, there are two downlink synchronization signals, a primary synchronization signal (PSS) and a secondary synchronization signal SSS, transmitted by the eNB and used by the UE to obtain the cell identity and frame timing.

Due to the resource limitations for NB communication, it might not be possible or desirable to use a legacy synchronization signal, and SSS in particular. It is important that such a NB-SSS does not have an undesirable level of ambiguity. Such ambiguity may require complex processing at the receiver. In order to address the unique needs of narrow band communication, an NB-SSS transmission and detection technique is provided.

In an aspect of the disclosure, a method, a computer-readable medium, and an apparatus are provided for wireless communication at an eNB. The apparatus generates an SSS signal, wherein the SSS sequence spans multiple orthogonal frequency division multiplexing (OFDM) symbols, and each OFDM symbol of the SSS sequence is mapped to a code symbol of a forward error correction (FEC) codeword. Source symbols of the sequence of SSS symbols carry information about a cell identifier (PCID) and frame timing information, and parity symbols of the sequence of SSS symbols introduce redundancy and error correction capability for the detection of PCID and frame timing. The apparatus then transmits the SSS using an NB.

Each symbol of the sequence of SSS symbols may map to a short Zadoff-Chu (ZC) base sequence, wherein the sequence of SSS symbols are concatenated in a time domain according to an encoding rule derived from a linear block FEC encoder, e.g., based on a RS code. The FEC codeword may be shortened or extended to fit the resource allocation constraint for a SSS signal. A combination of cyclic shifts and root index may be used to generate the short Zadoff-Chu base sequences employed by a SSS symbol mapping, wherein different combinations of root index and cyclic shift will convey different cell ID and frame timing information. The mapping table of SSS may be configured by upper layer and known by both eNB and UE. The SSS generation may also include using parity check codes and using a constrained cyclic shift. Code symbols may be represented by a plurality of root indexes that are partitioned into two subsets based on a quadratic residue property and using a constrained cyclic shift mapping. The apparatus may signal additional information using a position of a null tone of the SSS base sequence mapping.

In another aspect of the disclosure, a method, a computer-readable medium, and an apparatus are provided for NB wireless communication at a UE. The apparatus receives a NB-SSS over a plurality of OFDM symbols, wherein each symbol of the NB-SSS comprises a short ZC sequence with a specific combination of root index and cyclic shift. The apparatus first derives path metrics for the received NB-SSS signal using cross-correlation for each of the plurality of symbols, then determines a candidate SSS source message from the received NB-SSS based on the derived path metrics and coding constraints of FEC codewords, and finally identifies a cell ID and frame timing information based on the candidate SSS source message.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating LTE examples of a DL frame structure, DL channels within the DL frame structure, an UL frame structure, and UL channels within the UL frame structure, respectively.

FIG. 5 illustrates and example of Root Index/Cyclic Shift mapping for NB-SSS.

FIG. 6 illustrates an example of a first null tone position for NB-SSS.

DETAILED DESCRIPTION

Figure 1:
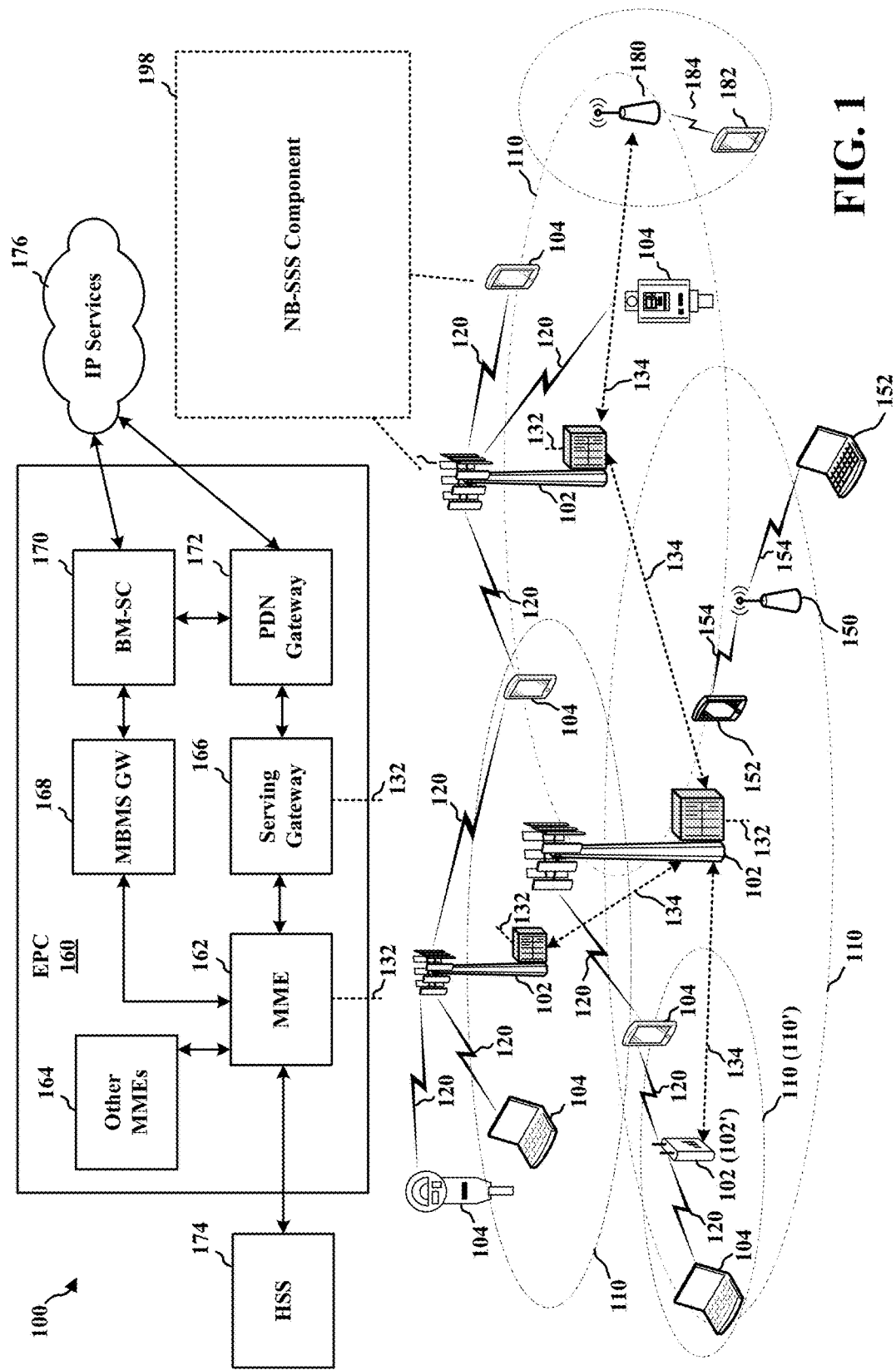
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The geographic coverage area 110 for a base station 102 may be divided into sectors or cells making up only a portion of the coverage area (not shown). The wireless communication network 100 may include base stations 102, 180 of different types (e.g., macro base stations or small cell base stations, described above). Additionally, the plurality of base stations 102 may operate according to different ones of a plurality of communication technologies (e.g., 5G (New Radio or "NR"), fourth generation (4G)/LTE, 3G, Wi-Fi, Bluetooth, etc.), and thus there may be overlapping geographic coverage areas 110 for different communication technologies.

The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The millimeter wave (mmW) base station 180 may operate in mmW frequencies and/or near mmW frequencies in communication with the UE 182. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 182 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. Additionally, a UE 104 may be Internet of Things (IoT) and/or machine-to-machine (M2M) type of device, e.g., a low power, low data rate (relative to a wireless phone, for example) type of device, that may in some aspects communicate infrequently with wireless communication network 100 or other UEs. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the eNB 102 may be configured to include an NB-SSS component 198. The NB-SSS may comprise a frame structure similar to LTE, e.g., as described in connection with FIGS. 2A-2D. In another example, the NB-SSS may have a 5G frame structure, e.g., as illustrated in FIG. 16.

Figure 16:
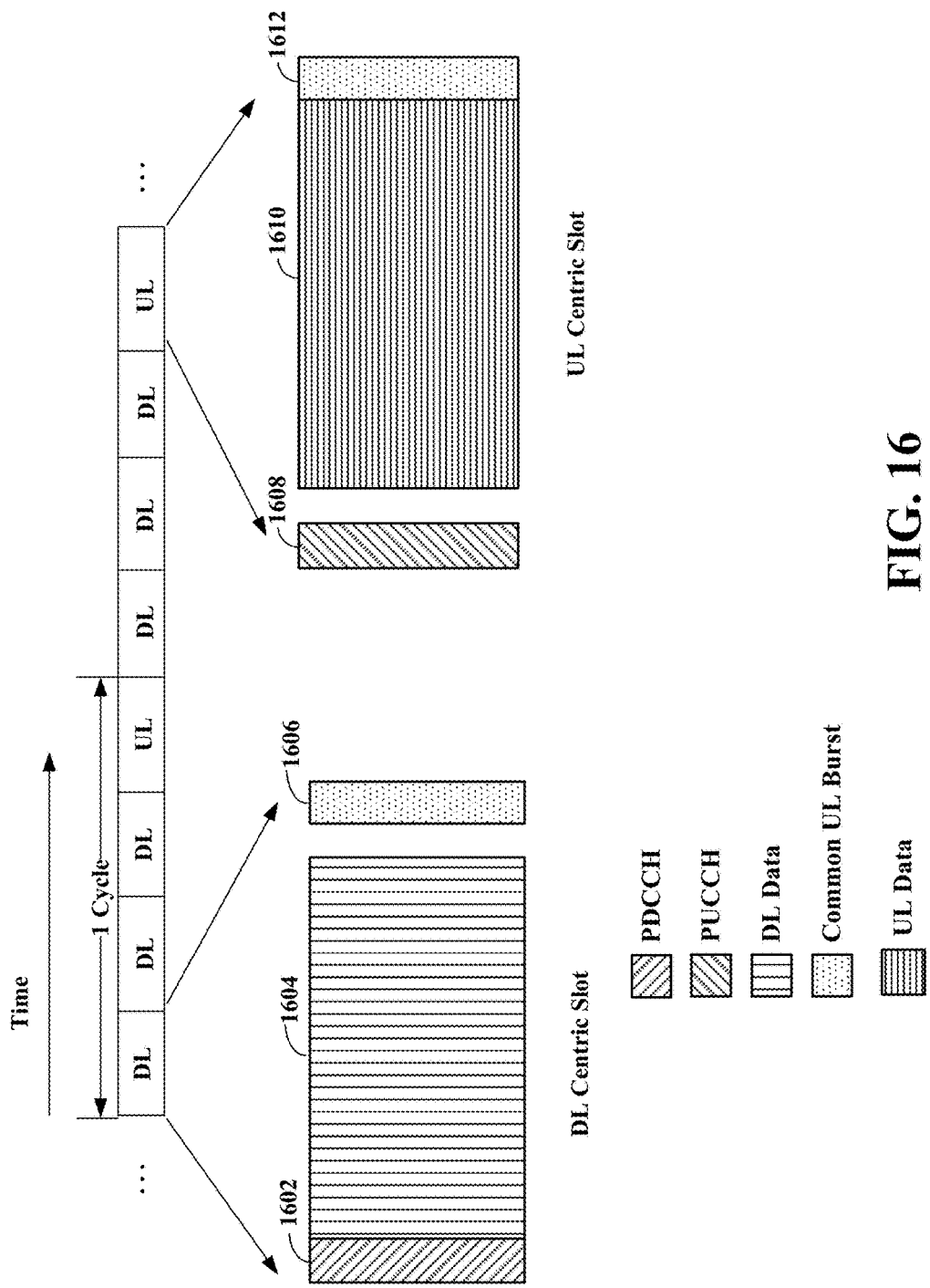
FIG. 16 illustrates an example 5G slot structure.

FIG. 16 illustrates an example 5G slot structure comprising DL centric slots and UL centric slots. In NR, a slot may have a duration of 0.5 ms, 0.25 ms, etc., and each slot may have 7 or 14 symbols. A resource grid may be used to represent the time slots, each time slot including one or more time concurrent resource blocks RBs, also referred to as PRBs. The resource grid may be divided into multiple resource elements REs. The number of bits carried by each RE depends on the modulation scheme.

A slot may be DL only or UL only, and may also be DL centric or UL centric. FIG. 16 illustrates an example DL centric slot. The DL centric slot may comprise a DL control region 1602, e.g., in which in which various scheduling and/or control information corresponding to various portions of the DL-centric subframe are transmitted. The control information may comprise a PDCCH, as illustrated in FIG. 16.

The DL-centric subframe may also include a DL data portion 1604. The DL data portion 1604 may sometimes be referred to as the payload of the DL-centric subframe. The DL data portion 1604 may include the communication resources utilized to communicate DL data from the scheduling entity (e.g., a UE or a base station (BS)) to the subordinate entity (e.g., a UE). In some configurations, the DL data portion 1604 may comprise a physical DL shared channel (PDSCH) that carriers user data, broadcast system information not transmitted through the PBCH such as system information blocks (SIBs), and paging messages, etc.

The DL-centric subframe may also include a common UL portion 1606. The common UL portion 1606 may sometimes be referred to as an UL burst, a common UL burst, and/or various other suitable terms. The common UL portion 1606 may include feedback information corresponding to various other portions of the DL-centric subframe. For example, the common UL portion 1606 may include feedback information corresponding to the control portion 1602. Non-limiting examples of feedback information may include an ACK signal, a NACK signal, a HARQ indicator, and/or various other suitable types of information. The common UL portion 1606 may include additional or alternative information, such as information pertaining to random access channel (RACH) procedures, scheduling requests, and various other suitable types of information. The end of the DL data portion 1604 may be separated in time from the beginning of the common UL portion 1606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is merely one example of a DL-centric subframe and alternative structures having similar features may exist without necessarily deviating from the aspects described herein.

Similar to the DL based slot, the UL based slot may comprise a control region 1608, e.g., for PDCCH transmissions. The control region 1602, 1608 may comprise a limited number of symbols at the beginning of a slot. The UL-centric subframe may also include an UL data portion 1610. The UL data portion 1610 may sometimes be referred to as the payload of the UL-centric subframe. The UL portion may refer to the communication resources utilized to communicate UL data from the subordinate entity (e.g., a UE) to the scheduling entity (e.g., a UE or a BS). In some configurations, the control portion 1608 may be a physical UL shared channel (PUSCH).

As illustrated in FIG. 16, the end of the control portion 1608 may be separated in time from the beginning of the UL data portion 1610. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 1612. The common UL portion 1612 in FIG. 16 may be similar to the common UL portion 1612 described above with reference to FIG. 16. The common UL portion 1606 may additionally, or alternatively, include information pertaining to a channel quality indicator (CQI), sounding reference signals (SRSs), and various other suitable types of information.

The UL centric slot may comprise a guard period. The DL control region 1602, may comprise a limited number of symbols at the beginning of a slot and the ULCB region may comprise one or two symbols of the slot, for both the DL centric and the UL centric slots. Resource management of PUSCH or PUCCH transmissions in the ULRB may be similar to that PUSCH or PUCCH for LTE. However, where LTE may be primarily driven by a SC-FDM waveform, NR may be based on an SC-FDM or OFDM waveform in the ULRB.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 f slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
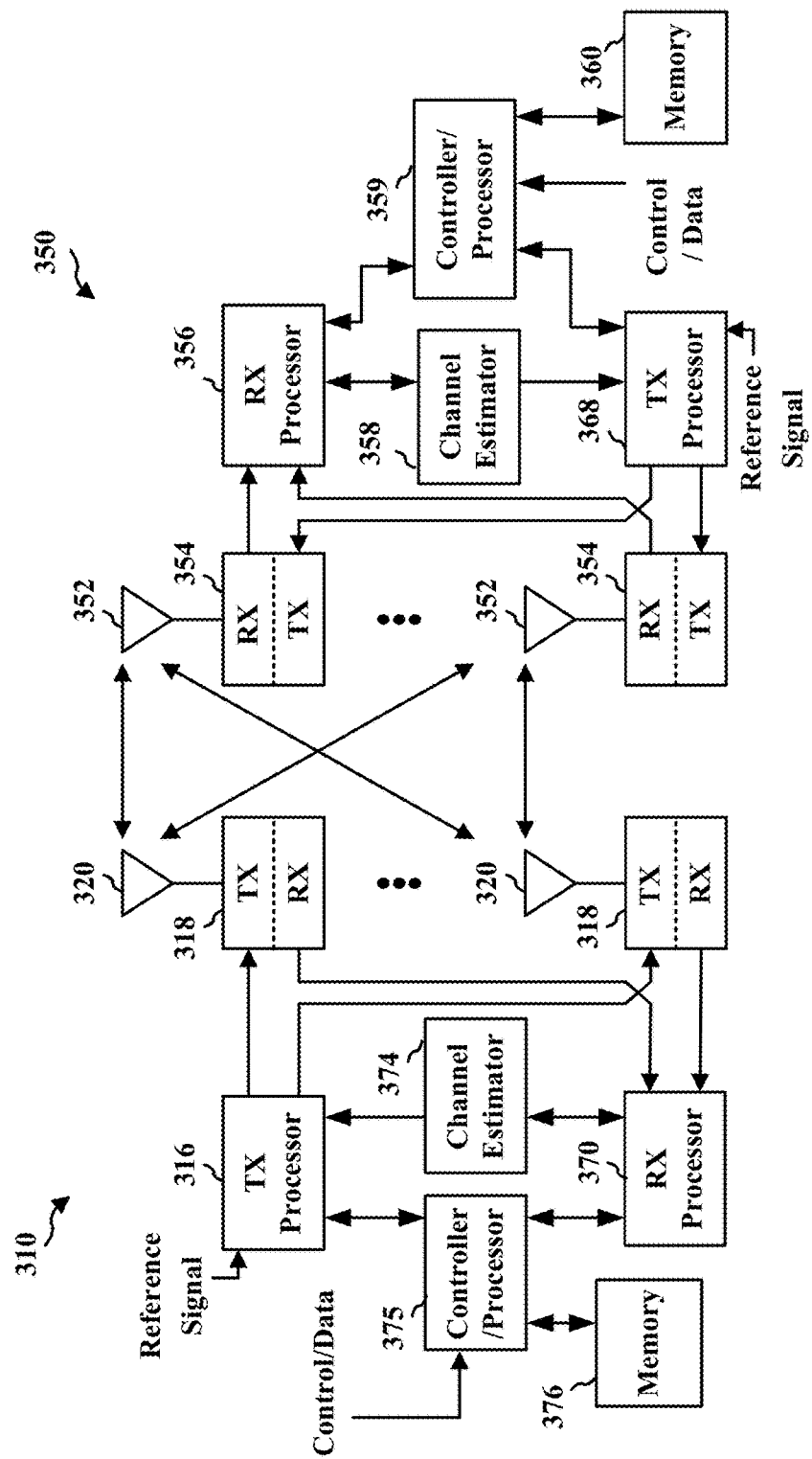
FIG. 3 is a diagram illustrating an example of an evolved Node B (eNB) and user equipment (UE) in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demuliplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356.

The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354 TX. Each transmitter 354 TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

NB wireless communication involves unique challenges due to the limited frequency dimension of the narrow band. One example of such NB wireless communication is NB-IOT, which is limited to a single resource block (RB) of system bandwidth, e.g., 180 kHz. Another example of NB wireless communication is eMTC, which is limited to six RBs of system bandwidth. This narrow band communication may be deployed "in-band," utilizing resource blocks within a carrier (e.g., an LTE carrier), or in the unused resource blocks within a carrier's guard-band, or standalone for deployments in dedicated spectrum. Multiple users, e.g., UEs may utilize the narrow band. While only some of the UEs may be active at a particular time, the NB communication should support such multi-user capacity.

In LTE, there are two downlink synchronization signals, a primary synchronization signal (PSS) and a secondary synchronization signal (SSS), transmitted by the eNB and used by the UE to obtain the cell identity and frame timing. For example, the PSS may be linked to the cell identity within a group, and the SSS may map to the cell identity group and the individual cell identity within the group. Then, PSS and SSS may be demodulated by the UE and used in order to identify the cell identify group and the individual cell ID within the cell identity group.

Due to the resource limitations for NB communication, it might not be possible or not desirable to use a legacy synchronization signal, and SSS in particular.

A Narrow Band Secondary Synchronization Signal (NB-SSS) may be used to convey a cell ID for an eNB and frame timing for the eNB. The NB-SSS design can use a concatenation of short Zadoff-Chu (ZC) sequences, wherein each ZC sequence is conveyed in every symbol of the NB-SSS and the concatenation is based on an encoding rule of an error correction code. The mapping from NB-SSS symbols to ZC sequences can use a combination of root indexes and cyclic shifts, for example. Thus, different root indexes or cyclic shifts may be used for the different symbols of the NB-SSS. An RB may include 12 tones, for example. In one example, out of 12 available tones, only 11 tones might be used. One tone may be reserved for a null tone, which can be used to signal additional system information such as deployment mode. A mapping may then be established for an NB-SSS symbol and each of the 11 remaining tones.

Figure 4:
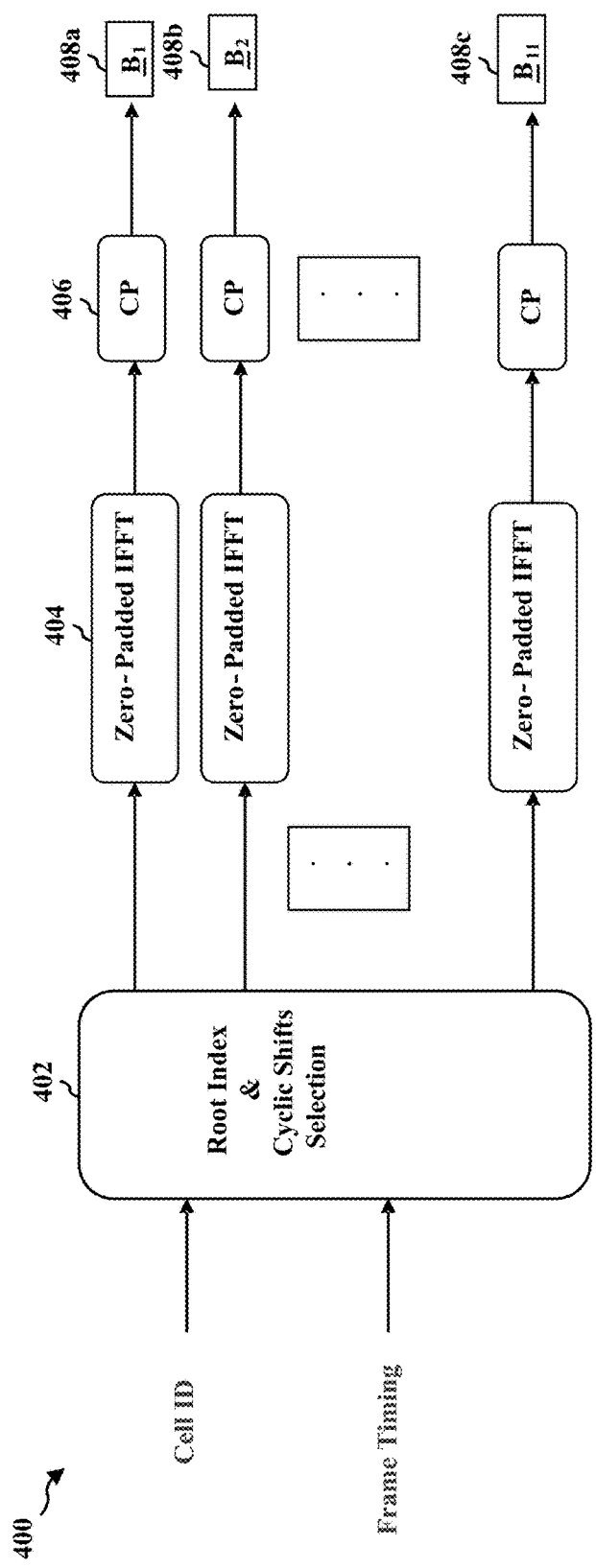
FIG. 4 illustrates an example of source information mapping for NB-SSS.

FIG. 4 illustrates an example source information mapping 400 for NB-SSS.

In FIG. 4, the source information, e.g., the cell ID for the eNB and the frame timing may be used to construct the codeword corresponding to a NB-SSS sequence. FIG. 4 illustrates that each symbol of the NB-SSS sequence may be constructed using, e.g., at least one root index and cyclic shift 402. Inverse Fast Fourier Transform (IFFT) 404 and (CP) cyclic prefix 406 may be used in order to generate the symbols 408a-c of the NB-SSS, e.g., $B_1, B_2, \ldots, B_{11}$, etc. FIG. 4 illustrates the NB-SSS symbols $B_1$-$B_{11}$ may correspond to 11 out of 14 OFDM symbols of the subframe e.g., symbols 3-13 in FIG. 4.

Use of Single Root Sequence

The NB-SSS may be generated using a single root Zadoff-Chu base sequence with different cyclic shifts. In another example, a pair of conjugate roots may be used. The root sequences chosen for the NB-SSS symbols should be different from the NB-PSS symbols. Therefore, the eNB may identify one, or two, root indexes not used by NB-PSS that can be used to generate the NB-SSS. The eNB may then select a subset, Q, of the possible cyclic shifts and index them from 1 to Q. Different cyclic shifts from the subset Q of possible cycle shifts may be used in each symbol, e.g., with the cyclic shift being in the frequency domain. In other examples, the cyclic shift may be in the time domain.

An NB-SSS sequence mapping may be derived according to a forward error correction (FEC) code. The FEC codewords may comprise a linear block code, which have source symbols and parity symbols. The source symbols of the FEC codeword carry the cell ID and the frame timing information, and the redundancy introduced by parity symbols are used to check the consistency of codeword recovery and protect the source symbols from decoding errors incurred by channel impairments. In one example, the Reed Solomon (RS) code is used as the FEC code to construct the NB-SSS source symbols and parity symbols.

In this example, the eNB may define an RS code on a Galois Field (GF), GF(Q), with K source symbols. For example, the eNB may map the length-(Q−1) RS codeword to (Q−1) SSS symbols, and each SSS symbol is mapped to a ZC base sequence in frequency domain. There are Q different base sequences available in defining the alphabet of GF(Q), which for example can be constructed by using different combinations of root index and cyclic shifts of ZC sequence. The size of the information field may be sufficient to accommodate 504 possible PCIDs and 4 possible frame timing information. Constrained selection of cyclic shifts and root index for the base sequences may enhance robustness and reduce complexity for NB-SSS detection, by leveraging the good correlation properties of base sequences and the distance properties of Reed-Solomon FEC codewords.

In one example, the length of the NB-SSS may be either 11 or 12. In an example having a length of 11, at every symbol some of the possible cyclic shifts may be used to generate the NB-SSS symbol. The cyclic shifts may be in the frequency domain, and it is possible that shifts in the time domain may be used.

In order to derive a mapping for the NB-SSS, Reed-Solomon code may be used. Other linear block code may also be used.

In a first example, 8 out of the 11 possible cyclic shifts may be used to generate the NB-SSS. In this example, for Reed-Solomon code based on alphabet size 8 (GF $2^3$), the Reed-Solomon code will be RS(7,3). That is, each OFDM symbol may be associated with an element in an 8-ary alphabet, the code carrying 3*3=9 information bits. This example may be simpler for the eNB.

In a second example, 11 OFDM symbols may be used to construct the NB-SSS signal. In particular, 3 out of the 11 OFDM symbols will be used for source symbols of a forward error correction (FEC) codeword, and the rest of the OFDM symbols will be used as parity symbols of the FEC codeword. Moreover, each of the NB-SSS OFDM symbols can be mapped a Zadoff-Chu base sequence, which is chosen from 1 out of 16 candidates according to the encoding rule of FEC. The 16 base sequences can be constructed by different combinations of root index and cyclic shifts. The 16 base sequences can also be mapped to the alphabet of a Reed-Solomon code defined on GF($2^4$). In this example, a shortened Reed-Solomon code will be used to reduce the overhead of NB-SSS, which can be constructed as RS(11, 3). The 11-symbol codewords carry log $2(16^3)$=12 bits. This second example may perform better than the first example because of the larger coding gain.

In every symbol, the UE may perform cross correlation in time domain or frequency domain, and derive 8 complex correlation values for the first example using 8 cyclic shifts or 11 complex correlation values for the second example using 11 cyclic shifts. Then, the UE simply collects and coherently sums the appropriate correlation values according to the coding constraint of a Reed-Solomon encoder in order to decode the NB-SSS that it receives from the eNB and to determine the cell ID, timing information, and potential additional system information. The good auto and cross correlation properties of the base sequences can be leveraged by UE to remove the need to run a brute-force RS decoder for SSS detection. This can reduce both detection latency and power consumption of the UE, which is desirable for low-cost design of narrow-band devices.

Although these two examples show the use of 8 or 16 of the possible combinations of cyclic shifts and/or root index, other numbers of the possible cyclic shifts and root index may also be used to generate the base sequences of NB-SSS. Moreover, the length of the FEC codewords can be shortened or extended to fit the resource allocation for NB-SSS signal.

Use of Multiple Root Indexes/Constrained Cyclic Shift

Rather than using a single root sequence, in a second example, a plurality of root indexes may be used to generate the NB-SSS. In this example, binary or non-binary parity check codes may be used in order to construct an NB-SSS mapping. In the example having a single root sequence, the cyclic shift was used to convey the cell ID and timing information. In the example using multiple root indexes, the combination of root index and cyclic shift may be used to convey the cell ID and frame timing information. A root index partition may be based on a quadratic residue property to separate the potential root indexes into two exclusive subgroups. A constrained cyclic shift mapping may also be used based, e.g., on a generic or expanded RS codes. Constrained cyclic shifts may provide error protection capability for SSS information.

FIG. 5 illustrates an example root index/cyclic shift mapping 500 that may be used to construct an NB-SSS mapping. FIG. 5 illustrates that the non-zero root indexes, e.g., 1-10, may be partitioned into two mutually exclusive subsets $\Omega_0$ and $\Omega_1$. This partitioning may be based on a quadratic residue property. For example, the 10 NB-SSS symbols may be partitioned into two exclusive subgroups with different combinations of root indexes and cyclic shifts. Then $$M_i = [\,b_1\ \ b_2\ \ b_3\ \ b_4\ \ b_5\,] \leftrightarrow [\,u_{i,1}\ \ u_{i,2}\ \ u_{i,3}\ \ u_{i,4}\ \ u_{i,5}\,],$$

$$i = 1, 2$$

$$X(u_0, m) \triangleq \mathrm{mod}\!\left(\frac{u_0 m(m+N)}{2}, N\right)$$

$$X(u_1, m) \triangleq \mathrm{mod}\!\left(\frac{u_1 m(m+N+2N_{ID}^{(2)}+2M_0)}{2}, N\right)$$

In this calculation, $M_i$ is the i-th source symbol sequence, u corresponds to the root index, b corresponds to the source symbol, X is the phase rotation size of the base sequence, m is the index of the element within a base sequence, N is the periodicity of the phase rotation. It is optional to include the identity of the sector, i.e. $N_{ID}^{(2)}$, in configuring the phase rotation of a subset of root indexes.

Figure 9:
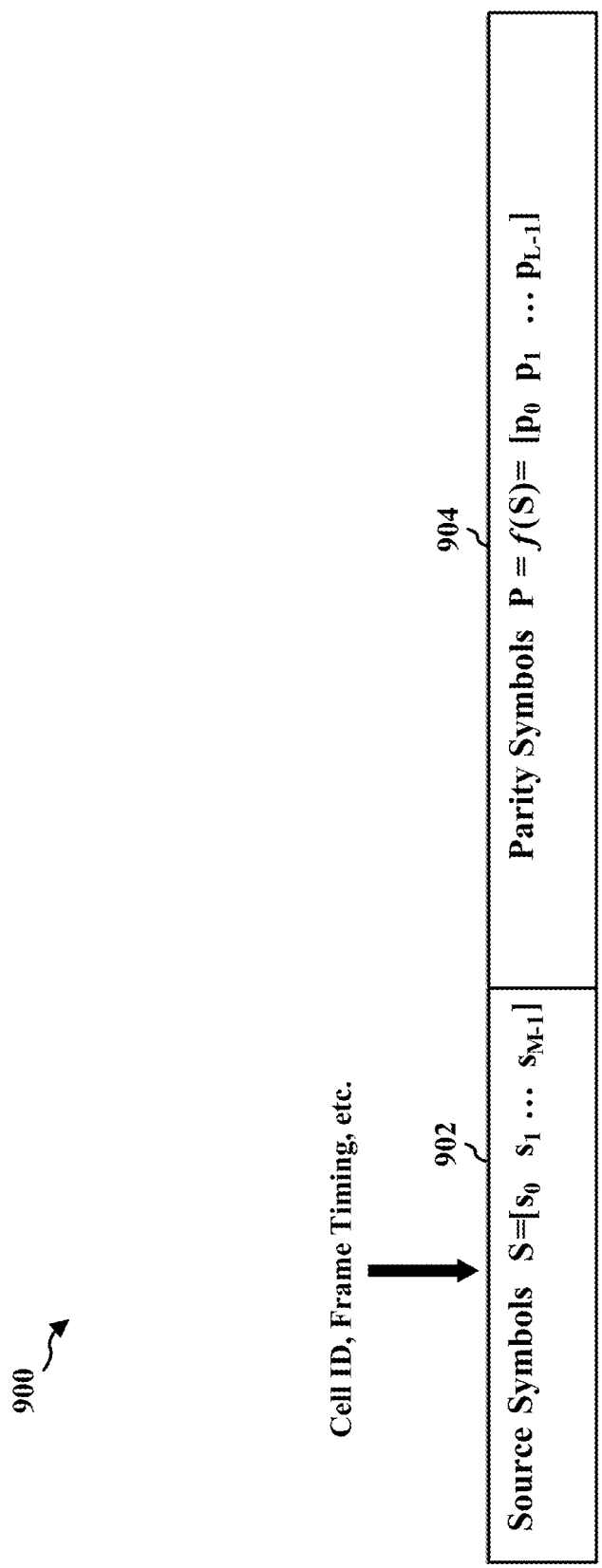
FIG. 9 illustrates example components of an NB-SSS.

The aspects presented herein reduce the complexity of the processing required by a receiver receiving the NB-SSS. For example, a UE receiving the NB-SSS may estimate or otherwise determine the cell ID, timing information, and any additional information without implementing a Forward Error Correction (FEC) decoder. For an alphabet of Q source symbols, a total length of the NB-SSS sequence with M source symbols and L parity symbols would be (M+L) symbols. Based on a structured SSS design, the entire SSS sequence may be split into two parts, i.e., [S|P], where vector S represents the source symbols and vector P represents parity symbols. The degrees of freedom of the parity symbols, P, may be constrained by the range of source symbols, S. The source symbols, S, may be used to carry the cell ID, frame timing, and potentially additional information. The frame timing may indicate a SFN. FIG. 9 illustrates the two parts of the NB-SSS, including the Source symbols 902 and the parity symbols 904.

The receiver may derive path metrics by cross-correlation across the symbols of the NB-SSS. Q×(M+L) cross correlations may be applied to the (M+L) symbols individually, either in the time domain or in the frequency domain. Hard-coded coding constraints may be used for selective combining of (M+L) cross correlations sequentially. $Q^M$ paths need to be exhausted. Each path metric may be the sum of (M+L) complex values, which correspond to the (M+L) symbol-wise cross correlations. The complexity may be upper bounded by Q(M+L) complex multiplications and $Q^M$ (M+L−1) complex additions. Further complexity reduction may be possible by exploiting the duplicity of route metrics and/or symmetry properties of the Zadoff-Chu sequence.

The receiver may also reduce the complexity of processing the NB-SSS by maintaining a list of cell IDs. Thus, once a cell ID is determined, the receiver may maintain that cell ID in a short list. The list of cell IDs may be used to sort or prune potential paths based on the magnitude of path metrics, the path corresponding to a codeword of NB-SSS sequence that conveys a cell ID and frame timing. Instead of selecting only a single cell ID, a short list of cell IDs may be stored for a number of purposes. In addition to the use in receiving NB-SSS and determining cell ID, the list of cell IDs may be used for any of cell selection for dual connectivity, cell verification in following stages, handover, etc.

The cross correlations performed by the receiver may be simplified based on the properties of ZC sequences. The NB-SSS comprises a short ZC sequence, such that each symbol of the NB-SSS comprises the ZC sequence in its entirety. Due the properties of the ZC sequence, the NB-SSS has a central symmetric property and will have a conjugate property. Thus, a dual transformation may be performed in the time and/or frequency domain, e.g., depending on whether the cross correlation is performed in the time or frequency domain. For example, alternative and efficient Discrete Fourier Transformation (DFT) or Inverse DFT (IDFT) may be performed for the NB-SSS. Additionally, the dual cyclic shift property in the time and/or frequency domain may reduce the complexity of the processing performed by the receiver. For example, rather than performing multiplication sample by sample prior to summing, based on the symmetry, two samples may be summed and a single multiplication may be performed. This reduces the required multiplication by half when performing cross-correlation.

For example, for a ZC sequence with Root Index μ, Cyclic Shift p and Odd Length N $$Z_{u,p}(k) \triangleq W_N^{\frac{\mu(k+p)(k+p+1)}{2}}, k = 0, 1, \ldots, N-1$$

$$W_N \triangleq \exp\left(-\frac{j2\pi}{N}\right)$$

In these calculations, Z is the ZC base sequence, W is the subcarrier sequence of DFT, k is the element index of the ZC sequence.

An IDFT of such a ZC Sequence would be:

$$b_{u,p}(n) \triangleq \sum_{k=0}^{N-1} Z_{u,p}(k) W_N^{-kn}, n = 0, 1, \ldots, N-1$$

In a Closed Form Expression, $$b_{u,p}(n) = Z_{u,0}^*(p) \left(\sum_{k=0}^{N-1} Z_{u,0}(k)\right)^* \times Z_{u,p}(u^{-1}n), n = 0, 1, \ldots, N-1$$

Therefore,
$uu^{-1} = 1 \bmod N$

This illustrates the conjugate nature of the NB-SSS. Table 1 illustrates reciprocal root indexes for a symbol length of N=11.

TABLE 1

| Reciprocal Root Indexes for N = 11 | | | | | | | | | | |
|---|---|---|---|---|---|---|---|---|---|---|
| μ | 1 | 2 | 3 | 4 | 5 | 6 | 7 | 8 | 9 | 10 |
| $\mu^{-1}$ | 1 | 6 | 4 | 3 | 9 | 2 | 8 | 7 | 5 | 10 |

Therefore, given a ZC base sequence with root index μ and cyclic shift "p" in the frequency domain, its waveform in the time domain can be generated by a constant phase rotation proportional to "p" and cyclically resampling with a decimation factor proportional to the reciprocal root index $u^{-1}$.

The NB-SSS may also signal additional information through the null tone position. Among others, this signaled additional information may include a group of cell IDs, a cell ID, a sector ID, an indication of time division duplex (TDD) or frequency division duplex (FDD), etc. Null tone positions may be used by an eNB to indicate an 80 ms boundary or other frame timing.

An example of different null tone positions may include, e.g., null tone positions in (1) the first tone, (2) last tone, or (3) combinations of the first tone and the last tone. Null tone positions may also be in the other tone locations than the first or the last tone. However, this may require a change of the Chu sequence property. The location of the null tones may convey information to the UE.

Figure 7:
FIG. 7 illustrates an example of a second null tone position for NB-SSS.
Figure 8:
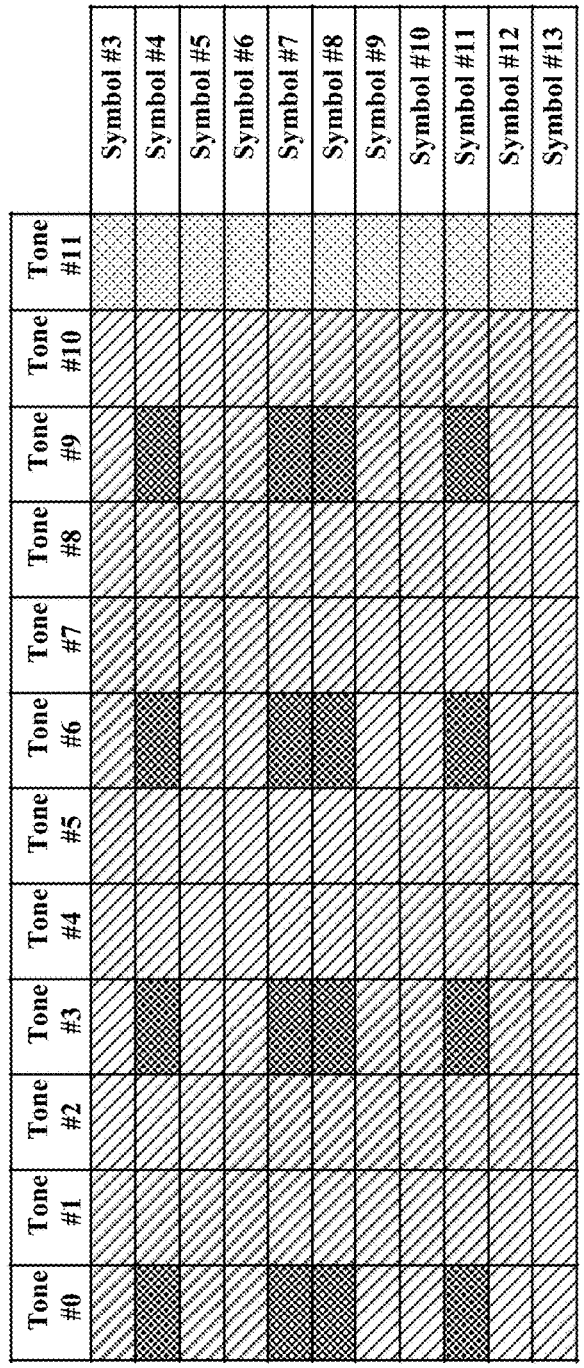
FIG. 8 illustrates an example of a third null tone position for NB-SSS.

FIGS. 6-8 show examples of null tone positioning that may be used to signal such additional information. FIGS. 6-8 illustrate an NB-SSS having a null tone at which no signal is transmitted by the eNB and an NB-SSS base sequence at which the SSS signal is transmitted by the eNB. The location of the null tone may be used to convey limited amount of system information, such as the sector ID, or the duplexing mode (FDD or TDD), or the deployment mode (in-band, guard-band, stand-alone). FIGS. 6-8 also illustrate a CRS puncture pattern. The CRS puncture may be employed, e.g., when the NB communication is deployed for in-band mode. When the NB communication is deployed for out-of-band modes (guard band or stand-alone), a CRS puncture might not be used.

In one example, the locations of null tones may be a function of sector ID.

The SSS null tone positioning in the configuration 600 of FIG. 6, in which the null tones are at Tone #0, or at the beginning of the NB-SSS, may correspond to Sector ID zero. Thus, if a UE does not receive a signal at Tone #0, the UE can understand that the SSS is for Sector ID 0.

The SSS null tone positioning in the configuration 700 of FIG. 7, in which some of the null tones are positioned at the beginning, Tone #0, and others are positioned at the end, Tone #11, of the NB-SSS may correspond to Sector ID 1. The null tone positioning in the configuration 800 of FIG. 8, in which the null tones are at Tone #11, or at the end of the NB-SSS, may correspond to Sector ID 2.

This use of null tone positions allows the eNB to signal additional information without requiring sophisticated coding for the information.

Figure 10:
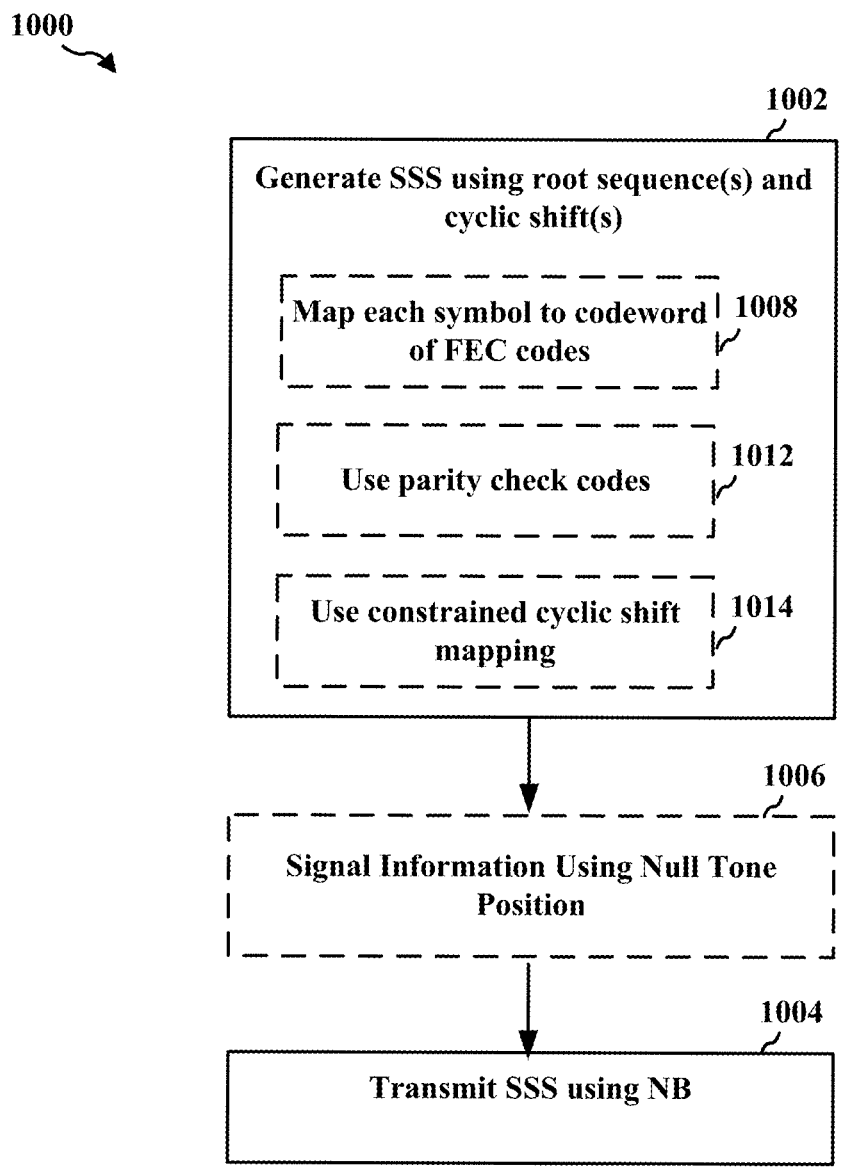
FIG. 10 is a flowchart of a method of wireless communication.

FIG. 10 is a flowchart 1000 of a method of NB wireless communication by a transmitter, such as an eNB. The method may be performed by an eNB (e.g., the eNB 102, 310, 1450, apparatus 1102, 1102').

At block 1002, the eNB generates a secondary synchronization signal (SSS), wherein the SSS signal comprises a sequence of orthogonal frequency division multiplexing (OFDM) symbols. Each symbol of the sequence of SSS symbols is mapped to a codeword symbol of an forward error correction (FEC) code, e.g., at block 1008. Source symbols of the sequence of SSS symbols carry a cell identifier (ID) and frame timing information. Parity symbols of the sequence of SSS symbols introduce redundancy and coding gain, e.g., to protect the source information against errors. Each symbol of the SSS sequence comprises a short ZC sequence. The NB-SSS construction may be subject to a code word/coding structure in order to reduce the complexity of processing the NB-SSS at the receiver. For example, the NB-SSS may be configured to enable the cell ID, e.g., PCID, and timing information to be estimated using cross-correlation for each of the symbols of the NB-SSS at the receiver. The code word structure may remove some of the ambiguity that may otherwise be present in an NB-SSS. The "short" ZC sequence means that each symbols conveys the entire ZC sequence. Different symbols may be based on a different root index or cyclic shift according to the code word structure. The code word structure may be based on a linear block code, such as a Reed-Solomon (RS) code.

The NB-SSS may additionally be generated according to the aspects illustrated in FIG. 4, e.g., including IFFT, CP, etc. in order to generate each of the NB-SSS symbols.

The NB-SSS construction enables a receiver to perform cross-correlation on a symbol-by-symbol basis and to use a collection of cross-metrics collected through the cross-correlation to derive a most likely NB-SSS candidate that carries the most likely cell ID and frame timing information.

At block 1004, the eNB transmits the SSS using the NB.

At block 1006, the eNB may also signal additional information using a position of a null tone of the SSS base sequence mapping, as described in connection with FIGS. 6-8. Optional aspects, such as block 1006 are illustrated in FIG. 10 with a dashed line. The signaled additional information comprise any of a sector ID, an ID for a group of cells, deployment mode, TDD, DDD, frame size information, etc. For example, the frame size information may indicate that the signal comprises an 80 ms boundary or another frame timing.

Each symbol of the sequence of SSS symbols may map to a short ZC base sequence, and the sequence of SSS symbols may be concatenated in a time domain according to an encoding rule derived from a linear block FEC encoder. The linear block FEC encoder may be based on a shortened RS code. A combination of cyclic shifts and root index may be used to generate the short ZC base sequences employed by the SSS symbol mapping. Different combinations of root index and cyclic shift can be used by the base sequences of SSS to convey different cell ID and frame timing information. A subset of the possible cyclic shifts may be used to generate the SSS mapping. For example, 8 of 11 possible cyclic shifts may be used along with the RS code to generate the symbols of the NB-SSS. In another example, each of the possible cyclic shifts may be used to generate the SSS mapping, e.g., 11 out of 11 possible cyclic shifts may be used along with the RS code to generate the symbols of the NB-SSS. Other choices of the number of cyclic shifts are also possible.

As another example, generating the SSS mapping at 1002 may include using parity check codes at block 1012, wherein the code symbols are represented by a plurality of root indexes that are partitioned into two subsets based on a quadratic residue property. FIG. 5 illustrates an example of root indexes partitioned into two subsets $\Omega_0$, $\Omega_1$ based on a quadratic residue property. FIG. 9 illustrates an example 900 of two parts of an NB-SSS, e.g., source symbols and parity symbols, where the source symbols convey cell ID, timing information, etc. Generating the SSS mapping may also comprise using a constrained cyclic shift mapping at block 1014, e.g., based on an RS code or other code. Different combinations of root index and cyclic shift for the subsets may convey the cell ID and the frame timing information.

Figure 11:
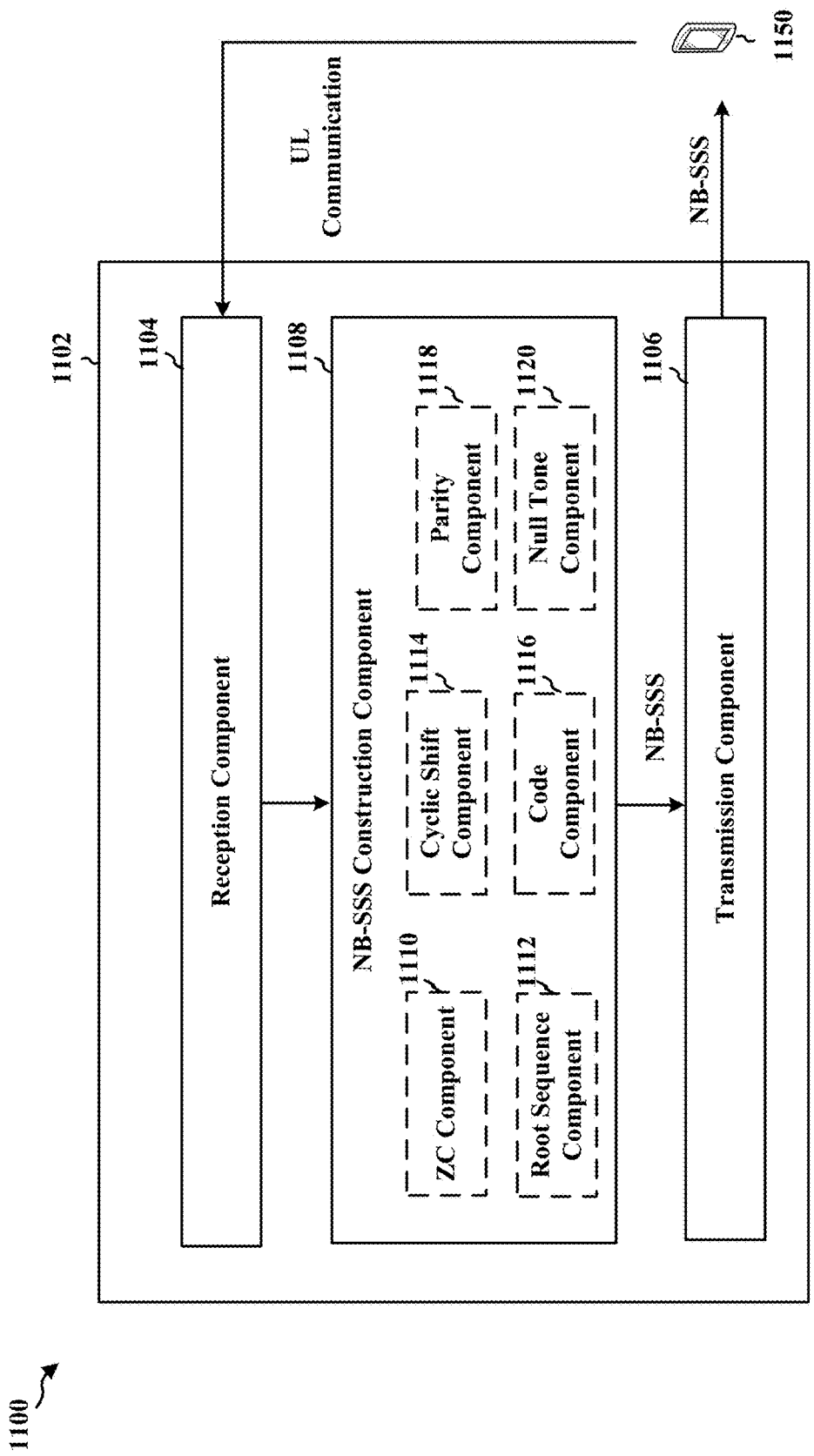
FIG. 11 is a conceptual data flow diagram illustrating the data flow between different means/components in an exemplary apparatus.

FIG. 11 is a conceptual data flow diagram 1100 illustrating the data flow between different means/components in an exemplary apparatus 1102. The apparatus may be an eNB. The apparatus 1102 includes a reception component for receiving UL communication of UE 1150 and an NB-SSS Construction Component 1108 configured to generate a wherein the SSS signal comprises a sequence of OFDM symbols, wherein each symbol of the sequence of SSS symbols are mapped to a codeword symbol of an FEC code, wherein source symbols of the sequence of SSS symbols carry a cell ID and frame timing information, and parity symbols of the sequence of SSS symbols introduce redundancy and coding gain, as described in connection with FIG. 9. The NB-SSS construction component may include any of a ZC Component 1110 configured to use a ZC sequence in constructing the NB-SSS, e.g., where each symbol of the sequence of SSS symbols maps to a short Zadoff-Chu base sequence, and where the sequence of SSS symbols are concatenated in a time domain according to an encoding rule derived from a linear block FEC encoder. The NB-SSS construction component may include a root sequence component 1112 configured to use a single root sequence or multiple root sequences in constructing the NB-SSS and a cyclic shift component 1114 configured to use at least one cyclic shift in generating the NB-SSS. For example, a combination of cyclic shifts and root index may be used to generate the short Zadoff-Chu base sequences employed by a SSS symbol mapping, wherein different combinations of root index and cyclic shift convey different cell ID and frame timing information. The NB-SSS construction component may include a Code component 1116 configured to use an encoding rule derived by a linear block FEC encoder, e.g., based on a shortened RS code. The NB-SSS construction component may include a parity component 1118 configured to use parity check codes in generating the NB-SSS, e.g., where code symbols are represented by a plurality of root indexes that are partitioned into two subsets based on a quadratic residue property. The cyclic shift component may use a constrained cyclic shift mapping. The NB-SSS construction component may include a Null Tone Component 1120 configured to use a position of a null tone of an SSS base sequence mapping to convey additional information to the receiver, such as described in connection with FIGS. 4-9. The apparatus 1002 also includes a transmission component 1106 that transmits DL communication to UE, included the generated SSS using a NB.

The apparatus 1102, may include additional components that perform each of the blocks of the algorithm in the aforementioned flowchart of FIG. 10 and the aspects described in connection with FIGS. 4-8. As such, each block in the aforementioned flowchart of FIG. 10 and the aspects described in connection with FIGS. 4-8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
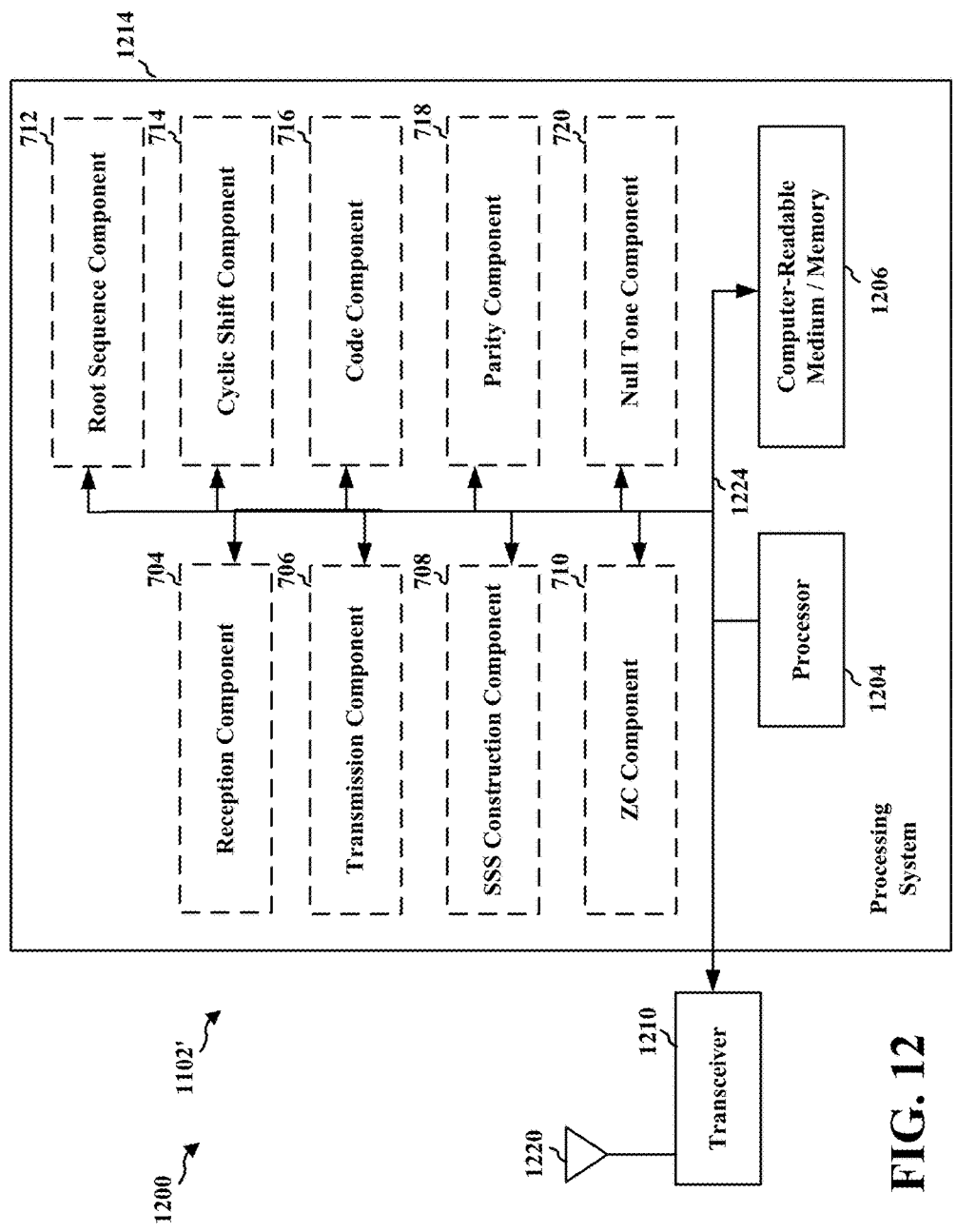
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware components, represented by the processor 1204, the components 1104, 1106, 1108, 1110, 1112, 1114, 1116, 1118, 1120, and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the reception component 1104. In addition, the transceiver 1210 receives information from the processing system 1214, specifically the transmission component 1106, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system 1214 further includes at least one of the components 1104, 1106, 1108, 1110, 1112, 1114, 1116, 1118, 1120. The components may be software components running in the processor 1204, resident/stored in the computer readable medium/memory 1206, one or more hardware components coupled to the processor 1204, or some combination thereof. The processing system 1214 may be a component of the eNB 310 and may include the memory 376 and/or at least one of the TX processor 316, the RX processor 370, and the controller/processor 375.

In one configuration, such an apparatus for wireless communication includes means for generating a secondary synchronization signal (SSS), means for transmitting the SSS signal using an NB, and means for signaling additional information using a position of a null tone of the SSS. The means for generating the SSS may include means for using parity check codes and means for using a constrained cyclic shift mapping.

The aforementioned means may be one or more of the aforementioned components of the apparatus and/or the processing system of the apparatus configured to perform the functions recited by the aforementioned means. As described supra, the processing system may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 13:
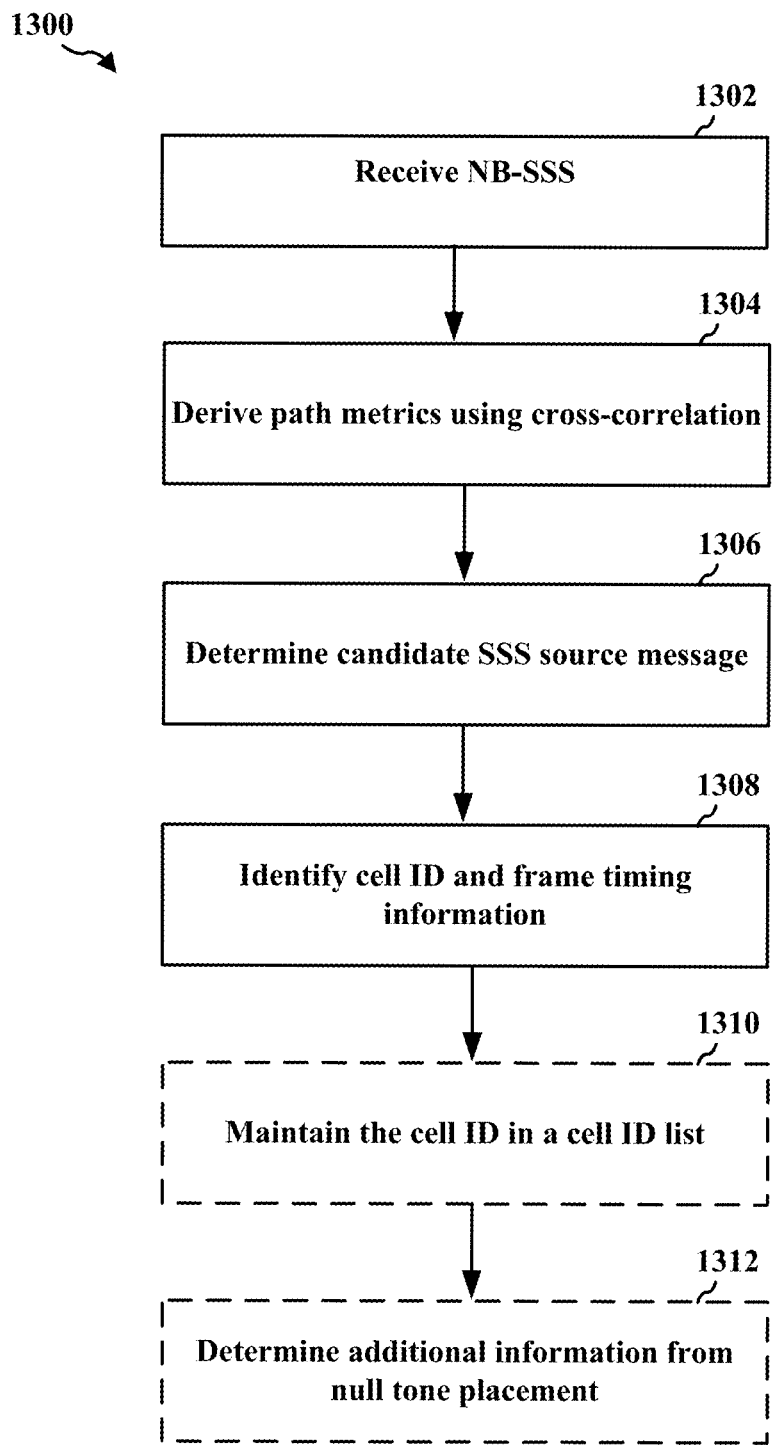
FIG. 13 is a flowchart of a method of wireless communication.

FIG. 13 is a flowchart 1300 of a method of wireless communication. The method may be performed by a UE (e.g., the UE 104, 350, 1150, the apparatus 1402, 1402'). Optional aspects of the method are illustrated with a dashed line.

At block 1302, the UE receives a NB-SSS sequence over a plurality of OFDM symbols. For example, the NB-SSS may be generated as described in connection with FIG. 10. Each symbol of the SSS may comprise a short Zadoff-Chu sequence with a combination of root index and cyclic shift. Each SSS sequence may comprises the concatenation of multiple short ZC sequences, and each ZC sequence may be comprised in each symbol of the SSS.

At block 1304, the UE derives path metrics for the received NB-SSS using cross-correlation for each of the plurality of symbols. The receiver may partition the NB-SSS into 11 symbols and perform the cross-correlation for each of the symbols. The cross-correlation may be performed in either a time domain or a frequency domain. The derivation of the path metrics for the received NB-SSS may include performing dual transformation in the time domain or the frequency domain based on a central symmetric property of the SSS.

At block 1306, the UE determines a candidate SSS source message for the received SSS signal based on the derived path metrics and coding constraints of FED codewords. The candidate SSS may be a highest ranked potential SSS sequence based on the path metrics.

At block 1308, the UE identifies a cell ID and timing information from the NB-SSS based on the candidate source message. The SSS sequence may comprise source symbols that carry the cell ID and timing information, and may also comprise parity symbols. The parity symbols may be constrained by a range of the source symbols. For example, the parity symbols may be derived from the source symbols and generated by an FEC encoder.

The UE may maintain, at block 1310, the identified cell ID in a list of cell IDs, wherein the list of cell IDs is used in determining the candidate SSS source message for the received NB-SSS. The list of cell IDs may be used to prune trellis paths corresponding to different codewords in determining the candidate SSS source message for the received NB-SSS.

The UE may determine additional information from a null tone placement at 1312, e.g., from a position of the null tone of the SSS base sequence mapping such as described in connection with FIGS. 6-8. The determined additional information may comprise any of a sector ID, an ID of a group of cells, a deployment mode, TDD, FDD, or frame size information.

Figure 14:
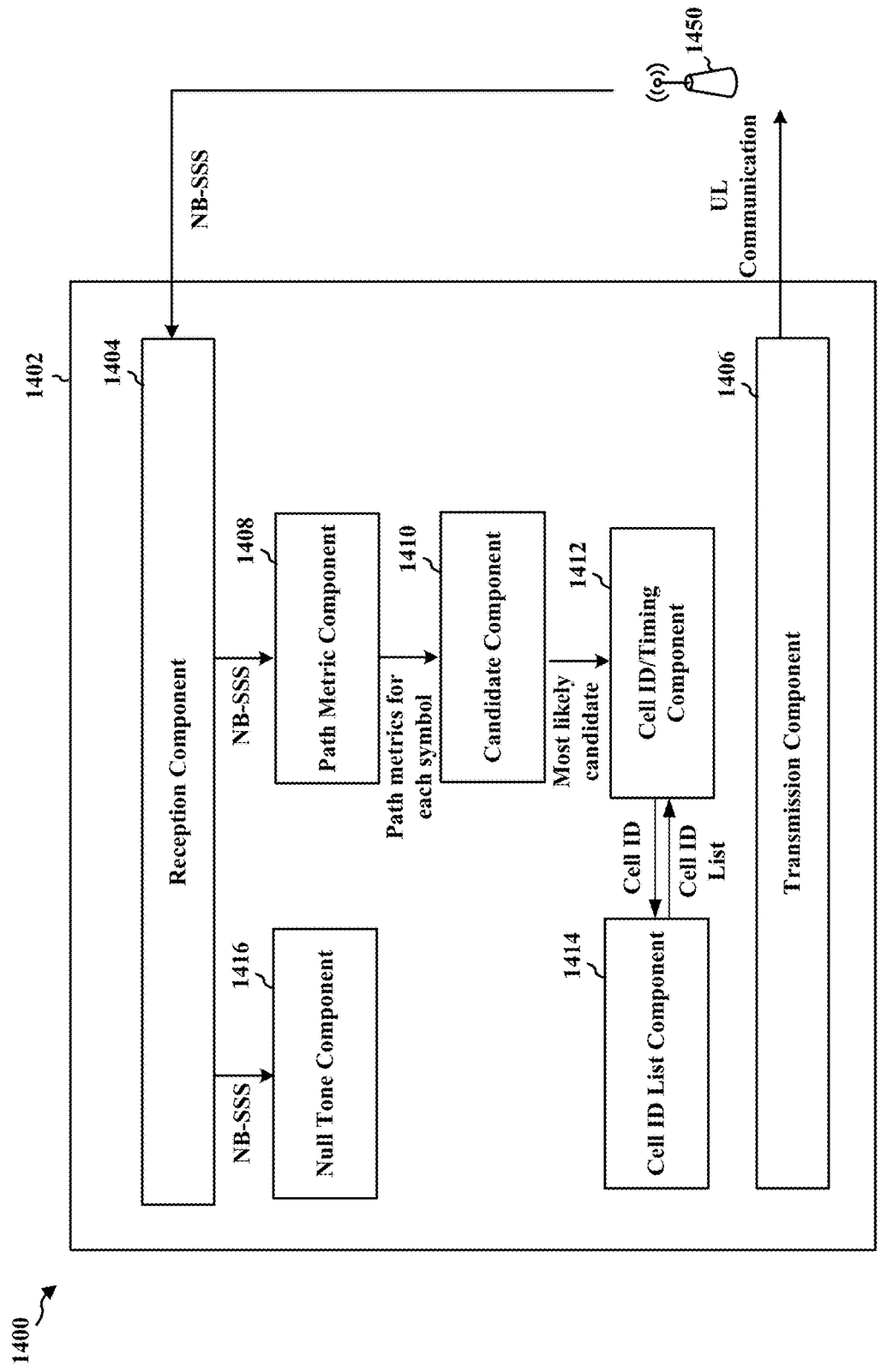
FIG. 14 is a conceptual data flow diagram illustrating the data flow between different means/components in an exemplary apparatus.

FIG. 14 is a conceptual data flow diagram 1400 illustrating the data flow between different means/components in an exemplary apparatus 1402. The apparatus may be a UE (e.g. UE 104, 350, 1150). The apparatus includes a reception component 1404 that receives DL communication including an NB-SSS from an eNB 1450 and a transmission component 1406 that transmits UL communication to the eNB 1450. The UE comprises a path metric component 1408 configured to derive path metrics for the received NB-SSS using cross-correlation, a candidate component 1410 configured to determine a candidate SSS source message from the received NB-SSS based on the derived path metrics and coding constraints of FEC codewords, a cell ID/timing component 1412 configured to identify a cell ID/frame timing for the NB-SSS based on the candidate SSS source message, a cell ID list component 1414 configured to maintain the identified cell ID in a cell ID list, and a null tone component 1416 configured to determine additional information from a location of a null tone.

The apparatus may include additional components that perform each of the blocks of the algorithm in the aforementioned flowchart of FIG. 13 and the aspects of FIGS. 4-8. As such, each block in the aforementioned flowchart of FIG. 13 and the aspects of FIGS. 4-8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 15:
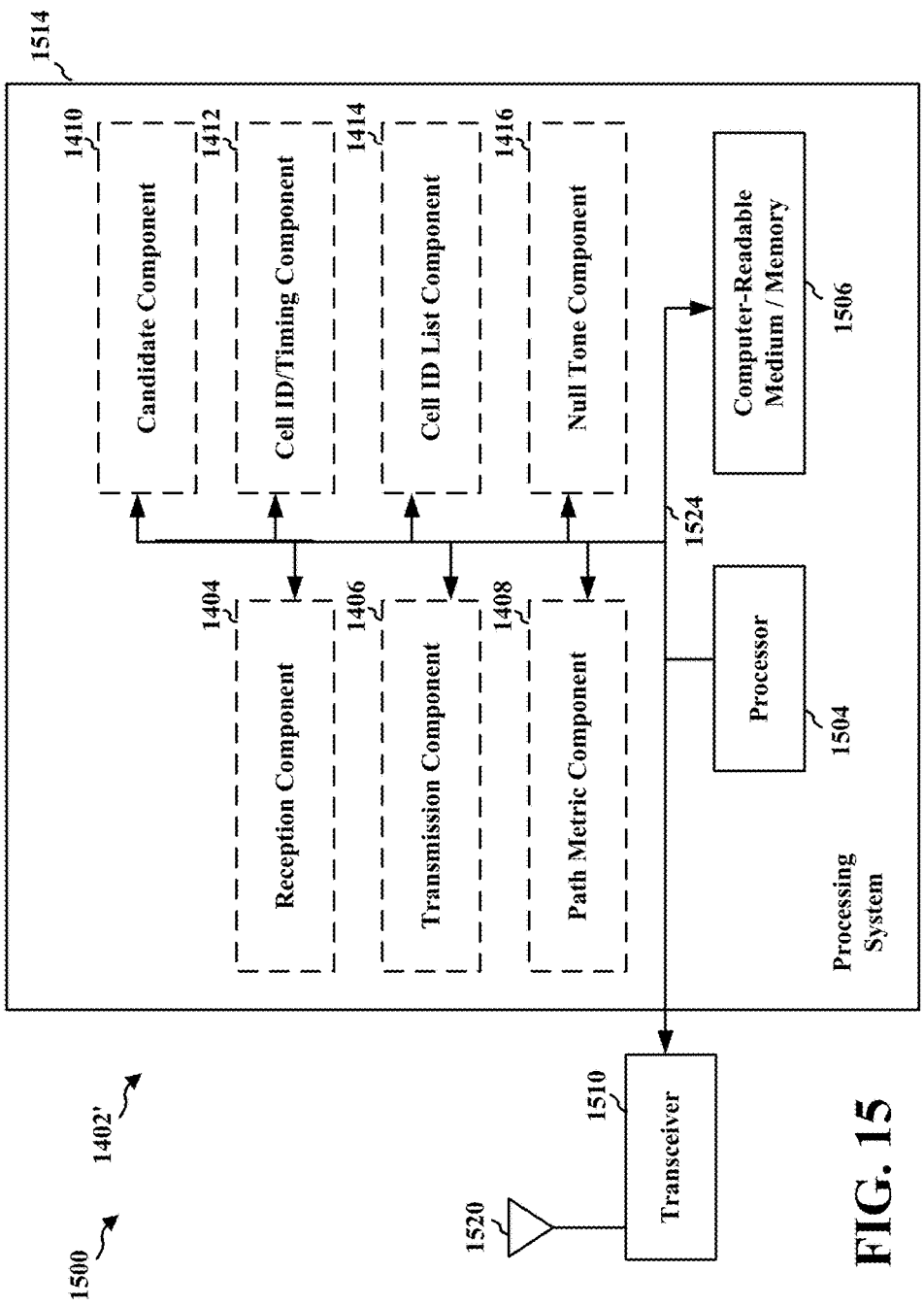
FIG. 15 is a diagram illustrating an example of a hardware implementation for an apparatus employing a processing system.

FIG. 15 is a diagram 1500 illustrating an example of a hardware implementation for an apparatus 1402' employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware components, represented by the processor 1504, the components 1404, 1406, 1408, 1410, 1412, 1414, 1416, and the computer-readable medium/memory 1506. The bus 1524 may also link various other circuits such as timing sources, peripherals, voltage regulators, and power management circuits, which are well known in the art, and therefore, will not be described any further.

The processing system 1514 may be coupled to a transceiver 1510. The transceiver 1510 is coupled to one or more antennas 1520. The transceiver 1510 provides a means for communicating with various other apparatus over a transmission medium. The transceiver 1510 receives a signal from the one or more antennas 1520, extracts information from the received signal, and provides the extracted information to the processing system 1514, specifically the reception component 1404. In addition, the transceiver 1510 receives information from the processing system 1514, specifically the transmission component 1406, and based on the received information, generates a signal to be applied to the one or more antennas 1520. The processing system 1514 includes a processor 1504 coupled to a computer-readable medium/memory 1506. The processor 1504 is responsible for general processing, including the execution of software stored on the computer-readable medium/memory 1506. The software, when executed by the processor 1504, causes the processing system 1514 to perform the various functions described supra for any particular apparatus. The computer-readable medium/memory 1506 may also be used for storing data that is manipulated by the processor 1504 when executing software. The processing system 1514 further includes at least one of the components 1404, 1406, 1408, 1410, 1412, 1414, 1416. The components may be software components running in the processor 1504, resident/stored in the computer readable medium/memory 1506, one or more hardware components coupled to the processor 1504, or some combination thereof. The processing system 1514 may be a component of the UE 350 and may include the memory 360 and/or at least one of the TX processor 368, the RX processor 356, and the controller/processor 359.

In one configuration, the apparatus 1402/1402' for wireless communication includes means for receiving an NB-SSS, means for deriving path metrics, means for determining a candidate SSS source message, means for identifying a cell ID and timing information, mean for maintaining the identified cell ID in a list of cell IDs, and means for determining additional information from a null tone placement. The aforementioned means may be one or more of the aforementioned components of the apparatus 1402 and/or the processing system 1514 of the apparatus 1402' configured to perform the functions recited by the aforementioned means. As described supra, the processing system 1514 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of narrow band (NB) wireless communication at a base station comprising:
    generating a secondary synchronization signal (SSS signal), wherein the SSS signal comprises a sequence of orthogonal frequency division multiplexing (OFDM) symbols, wherein each symbol of the sequence of SSS symbols is mapped to a codeword symbol of an forward error correction (FEC) code, wherein source symbols of the sequence of SSS symbols carry a cell identifier (ID) and frame timing information, and parity symbols of the sequence of SSS symbols introduce redundancy and coding gain, wherein generating the SSS signal comprises:
        using parity check codes, wherein code symbols are represented by a plurality of root indexes that are partitioned into two subsets based on a quadratic residue property; and
        using a constrained cyclic shift mapping; and
    transmitting the SSS signal using the NB.

2. The method of claim 1, wherein each symbol of the sequence of SSS symbols maps to a short Zadoff-Chu base sequence, and wherein the sequence of SSS symbols are concatenated in a time domain according to an encoding rule derived from a linear block FEC encoder.

3. The method of claim 2, wherein the linear block FEC encoder is based on a shortened Reed-Solomon Code.

4. The method of claim 2, wherein a combination of cyclic shifts and root index are used to generate the short Zadoff-Chu base sequence employed by a SSS symbol mapping, wherein different combinations of root index and cyclic shift convey different cell ID and frame timing information.

5. The method of claim 1, wherein different combinations of root index and cyclic shift for the two subsets convey the cell ID and the frame timing information.

6. The method of claim 1, further comprising:
    signaling additional information using a position of a null tone of a SSS base sequence mapping.

7. The method of claim 6, wherein the signaled additional information comprises at least one of a sector ID, an ID for a group of cells, a deployment mode, time division duplex (TDD), frequency division duplex (FDD), or frame size information.

8. An apparatus for narrow band (NB) wireless communication comprising:
    a memory; and
    at least one processor coupled to the memory and configured to:
        generate a secondary synchronization signal (SSS signal), wherein the SSS signal comprises a sequence of orthogonal frequency division multiplexing (OFDM) symbols, wherein each symbol of the sequence of SSS symbols is mapped to a codeword symbol of an forward error correction (FEC) code, wherein source symbols of the sequence of SSS symbols carry a cell identifier (ID) and frame timing information, and parity symbols of the sequence of SSS symbols introduce redundancy and coding gain, wherein the means for generating the SSS signal use parity check codes, wherein code symbols are represented by a plurality of root indexes that are partitioned into two subsets based on a quadratic residue property and use a constrained cyclic shift mapping; and
        transmit the SSS signal using the NB.

9. The apparatus of claim 8, wherein each symbol of the sequence of SSS symbols maps to a short Zadoff-Chu base sequence, and wherein the sequence of SSS symbols are concatenated in a time domain according to an encoding rule derived from a linear block FEC encoder.

10. The apparatus of claim 9, wherein the linear block FEC encoder is based on a shortened Reed-Solomon Code.

11. The apparatus of claim 9, wherein a combination of cyclic shifts and root index are used to generate the short Zadoff-Chu base sequence employed by a SSS symbol mapping, wherein different combinations of root index and cyclic shift convey different cell ID and frame timing information.

12. The apparatus of claim 8, wherein different combinations of root index and cyclic shift for the two subsets convey the cell ID and the frame timing information.

13. The apparatus of claim 8, wherein the at least one processor is configured to:
    signal additional information using a position of a null tone of a SSS base sequence mapping.

14. A method of narrow band (NB) wireless communication at a user equipment (UE), comprising:
    receiving a NB secondary synchronization signal (NB-SSS signal) over a plurality of orthogonal frequency division multiplexing (OFDM) symbols, wherein each symbol of the NB-SSS signal comprises a short Zadoff-Chu sequence with-a combination of root index and cyclic shift;
    deriving path metrics for the received NB-SSS signal using cross-correlation for each of the plurality of OFDM symbols;
    determining a candidate SSS source message from the received NB-SSS signal based on the derived path metrics and coding constraints of forward error correction (FEC) codewords; and
    identifying a cell identifier (ID) and timing information from the NB-SSS signal based on the candidate SSS source message.

15. The method of claim 14, wherein the sequence of SSS symbols comprises source symbols and parity symbols, wherein the parity symbols are derived from the source symbols and generated by an FEC encoder, and the source symbols carry the cell ID and frame timing information.

16. The method of claim 14, further comprising:
    maintaining the identified cell ID in a list of cell IDs, wherein the list of cell IDs is used in determining the candidate SSS source message for the received NB-SSS signal.

17. The method of claim 16, wherein the list of cell IDs is used to prune trellis paths corresponding to different codewords in determining the candidate SSS source message for the received NB-SSS signal.

18. The method of claim 14, wherein the cross-correlation is performed in either a time domain or a frequency domain.

19. The method of claim 18, wherein deriving path metrics for the received NB-SSS comprises performing dual transformation in the time domain or the frequency domain based on a central symmetric property of the NB-SSS signal.

20. The method of claim 14, further comprising:
 determining additional information from a null tone placement.

21. The method of claim 20, wherein the determined additional information comprises at least one of a sector ID, an ID for a group of cells, a deployment mode, time division duplex (TDD), frequency division duplex (FDD), or frame size information.

22. An apparatus for narrow band (NB) wireless communication, comprising:
 a memory; and
 at least one processor coupled to the memory and configured to:
  receive a NB secondary synchronization signal (NB-SSS signal) over a plurality of orthogonal frequency division multiplexing (OFDM) symbols, wherein each symbol of the NB-SSS signal comprises a short Zadoff-Chu sequence with a combination of root index and cyclic shift;
  derive path metrics for the received NB-SSS signal using cross-correlation for each of the plurality of OFDM symbols;
  determine a candidate SSS source message from the received NB-SSS signal based on the derived path metrics and coding constraints of forward error correction (FEC) codewords; and
  identify a cell identifier (ID) and timing information from the NB-SSS signal based on the candidate SSS source message.

23. The apparatus of claim 22, wherein the sequence of SSS symbols comprises source symbols and parity symbols, wherein the parity symbols are derived from the source symbols and generated by an FEC encoder, and the source symbols carry the cell ID and frame timing information.

24. The apparatus of claim 22, wherein the at least one processor is further configured to:
 maintain the identified cell ID in a list of cell IDs, wherein the list of cell IDs is used in determining the candidate SSS source message for the received NB-SSS signal.

25. The apparatus of claim 24, wherein the list of cell IDs is used to prune trellis paths corresponding to different codewords in determining the candidate SSS source message for the received NB-SSS signal.

26. The apparatus of claim 22, wherein the cross-correlation is performed in either a time domain or a frequency domain.

27. The apparatus of claim 26, wherein deriving path metrics for the received NB-SSS comprises performing dual transformation in the time domain or the frequency domain based on a central symmetric property of the NB-SSS signal.

28. The apparatus of claim 22, wherein the at least one processor is further configured to:
 determine additional information from a null tone placement.

29. A method of narrow band (NB) wireless communication at a user equipment (UE), comprising:
 receiving a secondary synchronization signal (SSS signal) over a plurality of orthogonal frequency division multiplexing (OFDM) symbols, wherein each symbol of the SSS signal comprises a combination of root index and cyclic shift;
 deriving path metrics for the received SSS signal using cross-correlation for each of the plurality of OFDM symbols;
 determining a candidate SSS source message from the received SSS signal based on the derived path metrics and coding constraints of forward error correction (FEC) codewords, wherein the SSS signal comprises source symbols and parity symbols, wherein the parity symbols are derived from the source symbols and generated by an FEC encoder, and the source symbols carry the cell ID and frame timing information; and
 identifying a cell identifier (ID) and timing information from the SSS signal based on the candidate SSS source message, wherein the source symbols carry the cell ID and the frame timing information, and wherein the cell ID and timing information are identified based on code symbols being represented by a plurality of root indexes that are partitioned into two subsets based on a quadratic residue property using a constrained cyclic shift mapping.

30. The method of claim 29, wherein different combinations of root index and cyclic shift for the two subsets convey the cell ID and the frame timing information.

31. An apparatus for narrow band (NB) wireless communication, comprising:
 a memory; and
 at least one processor coupled to the memory and configured to:
  receive a secondary synchronization signal (SSS signal) over a plurality of orthogonal frequency division multiplexing (OFDM) symbols, wherein each symbol of the SSS signal comprises a combination of root index and cyclic shift;
  derive path metrics for the received SSS signal using cross-correlation for each of the plurality of OFDM symbols;
  determine a candidate SSS source message from the received SSS signal based on the derived path metrics and coding constraints of forward error correction (FEC) codewords, wherein the SSS signal comprises source symbols and parity symbols, wherein the parity symbols are derived from the source symbols and generated by an FEC encoder, and the source symbols carry the cell ID and frame timing information; and
  identify a cell identifier (ID) and timing information from the SSS signal based on the candidate SSS source message, wherein the source symbols carry the cell ID and the frame timing information, and wherein the cell ID and timing information are identified based on code symbols being represented by a plurality of root indexes that are partitioned into two subsets based on a quadratic residue property using a constrained cyclic shift mapping.

32. The method of claim 31, wherein different combinations of root index and cyclic shift for the two subsets convey the cell ID and the frame timing information.

* * * * *